(12) United States Patent
Andolfatto et al.

(10) Patent No.: US 6,261,632 B1
(45) Date of Patent: Jul. 17, 2001

(54) PROCESS FOR IMPROVING THE ADHESION OF METAL PARTICLES TO A CARBON SUBSTRATE

(75) Inventors: Franåoise Andolfatto; Sylvain Miachon, both of Lyons (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/377,686

(22) Filed: Aug. 20, 1999

(30) Foreign Application Priority Data

Aug. 21, 1998 (FR) .................................................. 98 10633

(51) Int. Cl.$^7$ ....................................................... B05D 3/10
(52) U.S. Cl. ........................ 427/113; 427/115; 427/125; 427/304; 205/205; 204/294; 429/44
(58) Field of Search ..................................... 427/113, 115, 427/125, 212, 217, 180, 301, 304; 428/403; 205/205, 210; 204/283, 284, 294; 429/44

(56) References Cited

U.S. PATENT DOCUMENTS

| | | | |
|---|---|---|---|
| 3,138,560 | | 6/1964 | Keith et al. ............................ 252/447 |
| 4,454,649 | * | 6/1984 | Jalan et al. . |
| 4,481,303 | * | 11/1984 | McIntyre et al. . |
| 4,614,692 | | 9/1986 | Kajiyama et al. ...................... 429/44 |
| 4,835,074 | * | 5/1989 | Bolster et al. . |
| 5,783,514 | | 7/1998 | Schick et al. ........................... 502/185 |
| 6,120,571 | * | 9/2000 | Aihara et al. . |

* cited by examiner

Primary Examiner—Fred J. Parker
(74) Attorney, Agent, or Firm—Millen White Zelano & Branigan

(57) ABSTRACT

The present invention relates to a process for improving the adhesion of metal particles to a carbon substrate, characterized in that, before the said metal particles are deposited on the carbon substrate, the said substrate is treated in an alkaline medium at a temperature of between 50° C. and 100° C. in a stream of a gas containing oxygen.

24 Claims, No Drawings

PROCESS FOR IMPROVING THE ADHESION OF METAL PARTICLES TO A CARBON SUBSTRATE

FIELD OF THE INVENTION

The present invention relates to a process for improving the adhesion of metal particles to a carbon substrate.

BACKGROUND OF THE INVENTION

More specifically, the invention relates to a process for improving the adhesion of particles of metals, such as platinum, to a carbon substrate, the supported metals being used, in particular, for manufacturing the electrodes of a membrane electrolysis cell having a cathode for the reduction of oxygen, which produces a solution of an alkali metal hydroxide and of chlorine by the electrolysis of an aqueous alkali-metal chloride (NaCl or KCl) solution.

Such an electrolysis cell generally consists of a cation exchange membrane which divides the cell into an anode compartment and at least one cathode compartment in which the cathode is placed, the compartment being supplied with a gas containing oxygen.

The anode and cathode reactions in such electrolytic processes using a cathode for the reduction of oxygen are:

at the anode: $2Cl^- \rightarrow Cl_2 + 2e^-$ 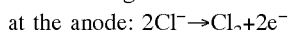

at the cathode: $H_2O + \tfrac{1}{2}O_2 + 2e^- \rightarrow 2OH^-$ 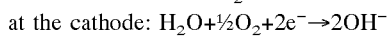

In order to speed up the reaction occurring at the cathode and lower the absolute value of the reaction overpotential these are employed, catalysts, generally noble metals such as platinum, silver or gold deposited on electrically conducting supports, such as in particular carbon materials having a high specific surface area.

Preferably, platinum or silver, and more particularly platinum, is used since, although this is an expensive metal, it is the one for which the cathodic overpotential is lowest in absolute value.

It has been found in tests on the stability of catalysts based on platinum deposited on carbon in hot concentrated sodium hydroxide under oxygen for several hours that there is a significant loss of platinum.

This significant loss of platinum results in a deterioration in the electrochemical performance, such as an increase in the cell voltage.

This loss of platinum from the catalyst used in the electrodes of membrane electrolysis cells having a cathode for the reduction of oxygen has been mentioned by various authors.

Thus, S. Kohda et al. in Soda to Enso, 1995, Volume 46(10), pages 402 to 419 (Absc. Number: 124-129655) report that, after a continuous operation of 175 days, analysis of the electrodes indicates a considerable loss of platinum. This loss, according to these authors, is influenced by the operating conditions and in particular by the electric current.

In order to limit the loss of platinum, these authors have proposed using platinum-iridium as the catalyst.

Kagaku Koggakukai in Soda to Enso, 1996, Volume 47(1), pages 16 to 31 points out that, in the case of air cathodes in a basic medium (NaOH solution containing 9 mol/l of NaOH) at 85° C., there is a loss of platinum and a deterioration of the carbon support.

SUMMARY OF THE INVENTION

A process for improving the adhesion of metal particles to a carbon substrate has now been discovered, this being characterized in that, before the said metal particles are deposited on the carbon substrate, the said carbon substrate is treated in an alkaline medium at a temperature of between 50° C. and 100° C., and preferably close to 90° C., in a stream of a gas containing oxygen for a period of at least 2 hours and preferably of greater than 24 hours.

According to the present invention, the carbon substrate is introduced into a highly concentrated solution of an alkali metal hydroxide.

Preferably, sodium hydroxide (NaOH) solutions will be used. The concentration by weight of the alkali metal hydroxide solutions is at least 30% and preferably between 30% and 60%.

The amount by weight of treated substrate may vary over a wide range. Generally, from 0.1 g to 10 g per 100 ml of alkali metal hydroxide solution are treated.

According to the present invention, the gas containing oxygen is bubbled into the concentrated alkali metal hydroxide solution, the solution being heated to the treatment temperature and containing the carbon substrate to be treated.

Having completed the treatment, the substrate is filtered under reduced pressure and then rinsed several times with deionized water. Next, it is dried at 80° C./90° C. at atmospheric pressure and then under reduced pressure at approximately 100° C.

According to the present invention, the gas containing oxygen may be air, oxygen-enriched air or oxygen.

Preferably, oxygen will be used.

The volume concentration of oxygen in the gas is at least 20% and preferably at least 50%.

The oxygen-enriched gases are preferably decarbonated beforehand.

The metal particles comprising one or more metals may be deposited on the carbon substrate after treatment in an alkaline medium according to a preferred so-called impregnation-reduction method differing little from the protocol described by Bartholomev and Boudard in Journal of Catalysis, 1972, Volume 25, pages 173 to 181. However, according to the present invention, the first step of the protocol of partially oxidizing the carbon substrate at 600° C. is optional not mandatory, prior to subjecting the substrate treatment in the alkaline medium, in order to obtain an improvement in adhesion. Furthermore, whereas the fourth step of the protocol of reducing the impregnated substrate is advantageously carried out at 500° C. in a stream of hydrogen, it is even more advantageous to slowly raise the temperature to 500° C. during the reduction step.

By way of illustration of carbon substrates that can be used according to the present invention, mention may be made of the graphite called TIMCAL HSAG-® 300 having a specific surface area of 360 m²/g; SIBUNIT 5®, which is a carbon having a specific surface area of 360 m²/g; VULCAN XC-72R® carbon which is a furnace black having a specific surface area of 300 m²/g.

The process of the invention applies most particularly to any metal whose crystallites deposited on a carbon substrate have an average diameter of less than 10 nm.

By way of illustration of metals forming the metal particles deposited on the carbon substrate treated according to the process of the present invention, mention may be made of platinum, silver, gold, ruthenium, iridium or a mixture of two or more of the aforementioned metals. The invention relates most particularly to platinum or a platinum-silver mixture.

The stability test consists of introducing the material comprising metal particles deposited on the carbon substrate having undergone the alkaline treatment, hereinafter called material, in a highly concentrated solution of an alkali metal hydroxide.

Preferably, sodium hydroxide (NaOH) solutions will be used. The concentration by weight of the alkali metal hydroxide solutions is at least 30% and preferably between 30% and 60%.

The amount by weight of material tested may vary over a wide range. In general, it varies from 0.1 g to 10 g per 100 ml of alkali metal hydroxide solution.

According to the present invention, the gas containing oxygen is bubbled into the concentrated alkali metal hydroxide solution, the solution being heated to the treatment temperature and containing the material to be tested.

Having completed the stability test, the material is filtered under reduced pressure and then rinsed several times with deionized water. Next, it is dried at 80° C./90° C. at atmospheric pressure and then under reduced pressure at approximately 100° C.

According to the present invention, the gas containing oxygen may be air, oxygen-enriched air or oxygen.

Preferably, oxygen will be used.

The volume concentration of oxygen in the gas is at least 20% and preferably at least 50%.

The oxygen-enriched gases are preferably decarbonated beforehand.

The conditions of the stability test may be different from the substrate treatment conditions.

The process according to the present invention makes it possible to increase the adhesion of the metal particles to the carbon substrate and therefore limit the loss of metal particles.

Another subject of the invention relates also to the materials comprising metal particles preferably deposited by impregnation/reduction and to a carbon substrate treated according to the process of the present invention.

These materials may be advantageously used for making electrodes for electrolysis cells having a cathode for the reduction of oxygen.

The examples which follow illustrate the invention.

EXAMPLES

Carbon substrates used:

VULCAN XC-72 R® carbon This is a furnace black having a specific surface area of approximately 300 $m^2/g$, 120 $m^2/g$ of which is microporous and 88 $m^2/g$ of which is mesoporous;

TIMCAL HSAG-300® graphite This has a high specific surface area of approximately 360 $m^2/g$, 100 $m^2/g$ of which is microporous and 125 $m^2/g$ of which is mesoporous;

SIBUNIT 5® This is a Russian carbon which is intermediate between the two previous ones with regard to the degree of graphitization and which has a specific surface area of 360 $m^2/g$, 34 $m^2/g$ of which is microporous. This support was used after mechanical grinding so as to go from 0.2–0.5 mm granules to a fine powder.

DESCRIPTION OF THE PROCESS FOR THE ALKALINE TREATMENT OF THE SUBSTRATE

A 0.5 g mass of powdered carbon substrate to be treated was introduced into a 150 ml PFA flask containing 100 ml of a 50 wt % sodium hydroxide solution. The flask is closed by a stopper through which runs a PTFE tube (1 mm in diameter) which allows pure oxygen to be bubbled into the sodium hydroxide. The flow of pure oxygen into the sodium hydroxide solution is 4 bubbles per second. The oxygen is humidified beforehand by passing it through a flask, fitted with a sintered plate, containing water at 90° C. A bar magnet is used to keep the powder in suspension. The flasks are placed in an oil bath allowing their temperature to be stabilized at 90° C. This oil bath is placed on a heating system provided with magnetic stirring. The duration of the treatment was fixed at 100 hours; the level in the flasks is maintained, occasionally adding demineralized water in order to compensate for any loss due to evaporation.

Having completed the treatment, the powder is filtered under reduced pressure on a PTFE filter (0.5 $\mu$m pores), rinsed three times using 15 ml of deionized water, then dried for 48 hours at 85° C. and then dried under reduced pressure for 24 h at 1000C.

The abovementioned operating conditions are also those used for carrying out the stability test on the material obtained.

Example 1

1. The carbon substrate is pretreated according to the alkaline treatment process described above.

2. The platinum (or Pt+Ag) particles are deposited using the following operating method:

Poured into a beaker, with magnetic stirring, are 154 ml of ethanol (99.85% R. P. Normapur) and 40 ml of toluene (99.9% HPLC grade from Aldrich). After mixing, the metal salt(s) (6 ml of $H_2PtCl_6$ solution containing 85.5 g of Pt per litre, for example in order to obtain a catalyst containing 10% platinum) is (are) added. Next, 4 g of the carbon substrate treated in the alkaline medium according to 1. (or of untreated substrate) are added. This suspension is left with stirring and with nitrogen bubbling (a few bubbles per second) for several days at room temperature, which causes the solvents to evaporate. The powder thus obtained is dried for 24 hours at 85° C. in air and then 24 hours at 100° C. under reduced pressure, after which it is ground up. At this stage, it consists of a metal salt deposited on a carbon substrate.

When it is desired to obtain silver particles, the salt used is $AgNO_3$ (99.998%, from Aldrich). It is dissolved in ethanol.

The reduction is carried out by a stream of hydrogen, the powder being placed in a cell. After being mounted in a cold furnace, the circuit is purged using an inert gas for 5 minutes (0.75 l/h), and then the powder is supplied with hydrogen (at an equivalent flow rate). The temperature of the furnace undergoes the following cycle: a rise at 1° C./minute up to 500° C. and then a hold for 16 hours at 500° C.

3. The material comprising the carbon substrate treated in an alkaline medium according to 1., and the Pt (or Pt/Ag) particles deposited on the said substrate according to 2., undergo the alkaline treatment according to 1.

The results are given below in Table 1.

TABLE 1

| Metal deposited on treated carbon substrate | Average diameter of Pt crystallites (in mm) | Pt content before the stability test (wt %) | Pt content after the stability test (wt %) |
| --- | --- | --- | --- |
| Platinum on Sibunit | 4 | 10% | 9.8% |
| Platinum/silver on Sibunit | 3.5 | 9.8% | 9.3–9.2% |
| Platinum/silver on Vulcan | 4.5 | 9% | 8.6% |

Platinum analysis is carried out on the material itself by dissolving in aqua regia and then quantitatively measuring the platinum contained in this solution by ICP-AES (Inductively Coupled Plasma Atomic Emission Spectroscopy).

The average diameter of the platinum crystallites is obtained by analysis of the (111) line of the X-ray diffraction spectrum of the material. Example 2
(not according to the invention)

The material is obtained by depositing metal particles according to 2. described in Example 1 on a carbon substrate that has not been subjected to the treatment in an alkaline medium according to 1. described in Example 1.

The stability test is then carried out under the same conditions as those described in Example 1 according to 3.

The results are given below in Table 2.

TABLE 2

| Metal deposited on untreated carbon substrate | Average diameter of Pt crystallites (in nm) | Pt content before the stability test (by weight) | Pt content after the stability test (by weight) |
| --- | --- | --- | --- |
| Platinum on Vulcan | 5 | 9.9% | 4.5% |
| Platinum on graphite | 4 | 8.5% | 2.4% |
| Platinum on Sibunit | 4 | 8.9% | 6.9% |
| Platinum/silver on Sibunit | 4 | 4.2% | 1.8% |
| 10% E-Tek (Pt on Vulcan) | 3 | 8.5% | 5.4% |

Another aspect of this invention comprises providing a modified carbon substrate, especially a substrate having improved adhesion characteristics for metallic particles, but wherein the metallic particles were not deposited on the substrate before said treating.

Still another aspect comprises providing an electrolytic cell having a cathode composed of particles comprising platinum or a mixture of platinum and silver deposited on particulate carbon.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding German application 98/10633 are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process comprising adhering metal particles to a carbon substrate, the improvement comprising, treating said carbon substrate in an alkaline medium at a temperature of between 50° C. and 100° C. provided with a bubbled stream of a gas containing at least 20% by volume of oxygen, said treating being conducted for a period of at least 2 hours, and depositing said metal particles on the resultant treated carbon substrate thereby decreasing the rate of detachment of the particles compared to a process wherein an untreated carbon substrate is employed.

2. A process according to claim 1, wherein the temperature is about 90° C.

3. A process according to claim 1, wherein the alkaline medium is a concentrated solution of an alkali metal hydroxide.

4. A process according to claim 3, wherein the alkali metal hydroxide is sodium hydroxide.

5. A process according to claim 3, wherein the concentration by weight of the alkali metal hydroxide solution is at least 30%.

6. A process according to claim 1, wherein the gas containing oxygen is oxygen.

7. A process according to claim 1, wherein the metal particles are platinum or a mixture of platinum and silver.

8. A process according to claim 1, wherein said treating is conducted for at least 24 hours.

9. A process according to claim 5, wherein said treating is conducted for at least 24 hours.

10. A process according to claim 1, wherein the carbon substrate is a powder and metal crystallites have an average diameter of less than 10 nm.

11. A process according to claim 9, wherein the carbon substrate is a powder and the metal particles have an average diameter of less than 10 nm.

12. A process according to claim 11, wherein the metal particles are platinum or a mixture of platinum and silver.

13. A process according to claim 12, wherein the gas contains at least 50% by volume of oxygen.

14. A process according to claim 7, wherein the carbon substrate is a powder and the metal particles have an average crystallite diameter of less than 10 nm.

15. A carbon substrate having metal particles deposited thereon, the carbon substrate having been produced according to the process of claim 1.

16. Material according to claim 15 said the metal crystallites having been deposited on the carbon substrate by impregnation-reduction.

17. An electrode for an electrolysis cell having a cathode for the reduction of oxygen, said electrode composed of the carbon substrate according to claim 15.

18. An electrode according to claim 17, wherein said metal paticles are platinum or a mixture of platinum and silver, having an average crystallite diameter of less than 10 nm.

19. An electrolytic cell comprising an electrode according to claim 17.

20. A carbon substrate having metal particles deposited thereon, produced according to the process of claim 14.

21. An electrolytic cell comprising a cathode composed of the carbon substrate of claim 20.

22. An electrode composed of the carbon substrate of claim 20.

23. A process of modifying a carbon substrate comprising treating said carbon substrate at a temperature of between 50° C. and 100° C. in an alkaline medium provided with a bubbling stream of a gas containing at least 20% by volume of oxygen, for a period of at least 2 hours, wherein metallic particles have not been deposited on said substrate before said treatment.

24. A carbon substrate produced according to claim 23.

* * * * *

UNITED STATES PATENT AND TRADEMARK OFFICE
CERTIFICATE OF CORRECTION

PATENT NO. : 6,261,632 B1
DATED : July 17, 2001
INVENTOR(S) : Françoise Andolfatto et al.

It is certified that error appears in the above-identified patent and that said Letters Patent is hereby corrected as shown below:

Title page,
Item [75], Inventors, "Franaoise," should read -- Françoise --; and
"Lyons," should read -- Lyon --

Signed and Sealed this

Nineteenth Day of October, 2004

JON W. DUDAS
*Director of the United States Patent and Trademark Office*